(12) United States Patent
Buchholtz et al.

(10) Patent No.: US 8,960,178 B2
(45) Date of Patent: Feb. 24, 2015

(54) CUTTING CHAIN FOR A HAND-OPERATED IMPLEMENT AND HAND-OPERATED IMPLEMENT

(71) Applicant: Andreas Stihl AG & Co. KG, Waiblingen (DE)

(72) Inventors: Jochen Buchholtz, Waiblingen (DE); Matthias Schulz, Freiberg (DE); Helmut Zimmermann, Berglen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 221 days.

(21) Appl. No.: 13/650,154

(22) Filed: Oct. 12, 2012

(65) Prior Publication Data
US 2013/0269673 A1    Oct. 17, 2013

(30) Foreign Application Priority Data

Oct. 12, 2011 (DE) .......... 10 2011 115 719
May 31, 2012 (DE) .......... 10 2012 010 962

(51) Int. Cl.
*B23D 61/18* (2006.01)
*B28D 1/08* (2006.01)
*B28D 1/12* (2006.01)
*B27B 17/14* (2006.01)
*B23D 57/02* (2006.01)

(52) U.S. Cl.
CPC B28D 1/082 (2013.01); B28D 1/08 (2013.01); B28D 1/124 (2013.01); B27B 17/14 (2013.01); B23D 57/023 (2013.01)
USPC ............. 125/21; 83/830; 83/31; 83/32; 83/33

(58) Field of Classification Search
CPC .......... B23D 61/185; B28D 1/08; B28D 1/12; B28D 5/045; B28D 1/124; B28D 1/088
USPC ........ 125/21; 83/830, 31, 32, 33, 34, 853, 54, 83/85, 676
See application file for complete search history.

(56) References Cited

U.S. PATENT DOCUMENTS

| | | | |
|---|---|---|---|
| 2,348,612 A | | 5/1944 | Deacon |
| 3,298,406 A | * | 1/1967 | Erickson .................. 83/820 |
| 4,269,100 A | * | 5/1981 | Deelman et al. ............ 83/834 |
| 4,309,931 A | * | 1/1982 | Alexander ................. 83/832 |

(Continued)

FOREIGN PATENT DOCUMENTS

| | | |
|---|---|---|
| DE | 1 933 366 | 2/1966 |
| DE | 20 2011 051 060 U1 | 11/2011 |

*Primary Examiner* — George Nguyen
(74) *Attorney, Agent, or Firm* — Gudrun E. Huckett

(57) ABSTRACT

A cutting chain for a hand-operated implement for cutting metal and mineral materials such as a stone cutter has central connecting links which are connected to one another by lateral connecting links. The central connecting links comprise first central connecting links which each have a drive tooth. The cutting chain has two central connecting links with drive teeth shaped differently to the drive teeth on the first central connecting links; or located a different distance from the leading drive teeth; or having no drive teeth. A hand-operated implement for cutting mineral materials has a drive motor which drives the cutting chain around a guide bar by a drive sprocket. The cutting chain is guided round part of the circumference of the drive sprocket and round a nose sprocket on the guide bar. The drive sprocket or nose sprocket have different first and second areas matched to the cutting chain.

22 Claims, 9 Drawing Sheets

(56) References Cited

U.S. PATENT DOCUMENTS

| | | | |
|---|---|---|---|
| 4,382,334 A | 5/1983 | Reynolds | |
| 4,414,876 A * | 11/1983 | Loigerot | 83/830 |
| 4,461,269 A * | 7/1984 | Elliott | 125/21 |
| 4,567,803 A * | 2/1986 | Anderson | 83/833 |
| 4,796,360 A * | 1/1989 | Fischer et al. | 30/384 |
| 4,813,323 A * | 3/1989 | Harfst | 83/830 |
| 5,257,568 A * | 11/1993 | Nitschmann | 83/830 |
| 5,682,680 A * | 11/1997 | Haussermann et al. | 30/387 |
| 6,112,419 A | 9/2000 | Uhl et al. | |
| 6,112,632 A * | 9/2000 | Buchholtz et al. | 83/830 |
| 6,186,136 B1 | 2/2001 | Osborne | |
| 6,283,112 B1 * | 9/2001 | Berglund | 125/21 |
| 6,435,070 B1 * | 8/2002 | Weber | 83/834 |
| 7,434,575 B2 * | 10/2008 | Lehmann | 125/21 |
| 8,555,869 B2 * | 10/2013 | Osborne et al. | 125/21 |
| 2004/0025355 A1 * | 2/2004 | Harfst | 30/381 |
| 2004/0134478 A1 * | 7/2004 | Bailey | 125/21 |
| 2008/0011144 A1 * | 1/2008 | Harfst et al. | 83/830 |
| 2009/0077815 A1 * | 3/2009 | Wolf et al. | 30/383 |
| 2011/0061639 A1 * | 3/2011 | Osborne et al. | 125/21 |
| 2013/0269673 A1 * | 10/2013 | Buchholtz et al. | 125/21 |

\* cited by examiner

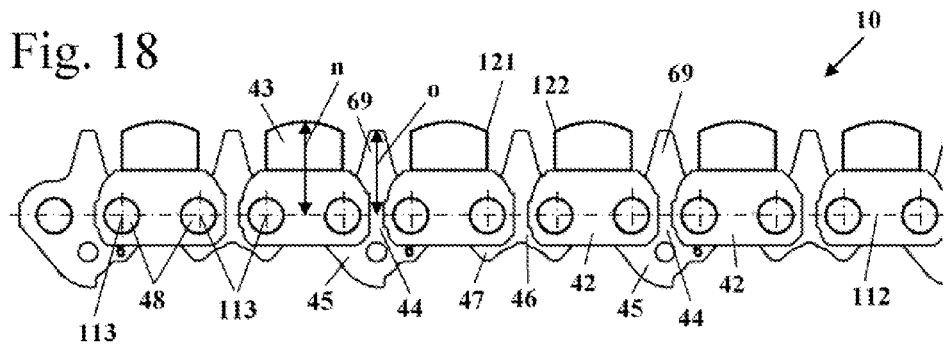
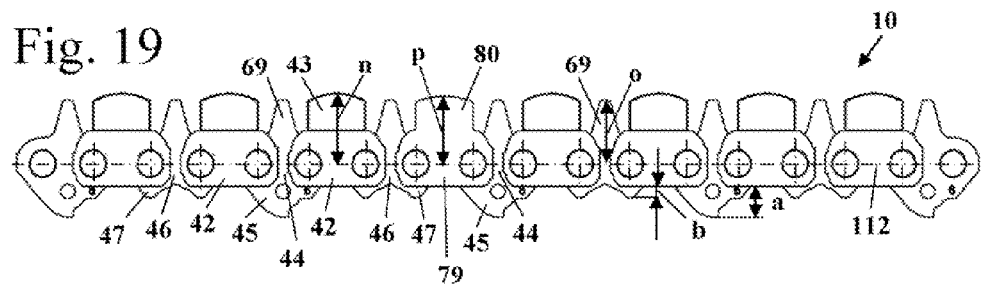
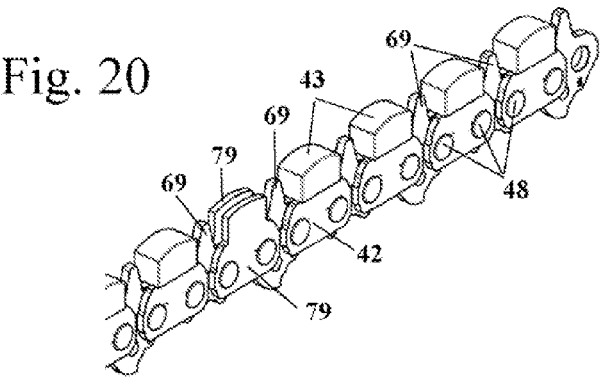
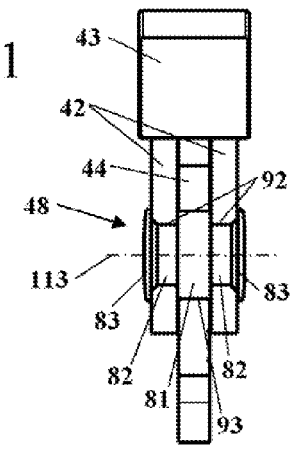

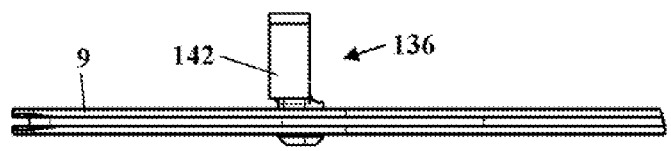
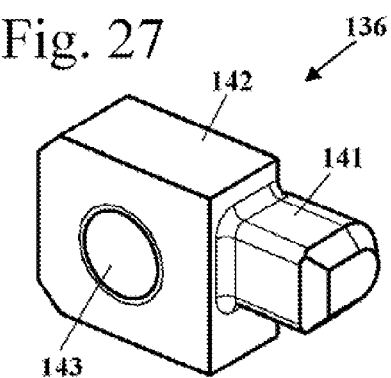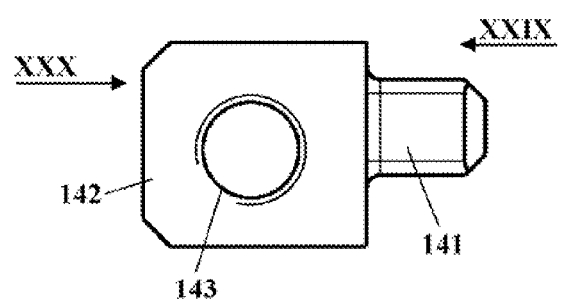
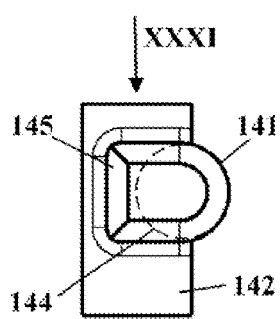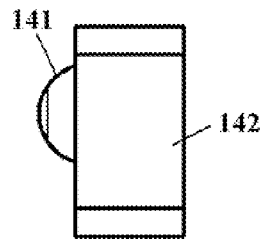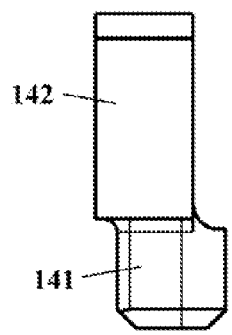

CUTTING CHAIN FOR A HAND-OPERATED IMPLEMENT AND HAND-OPERATED IMPLEMENT

BACKGROUND OF THE INVENTION

The invention relates to a cutting chain for a hand-operated implement for cutting metal and mineral materials, the cutting chain having central connecting links which are connected together by lateral connecting links, the central connecting links having first central connecting links which are configured as drive links and each have a drive tooth.

The invention further relates to a hand-operated implement for cutting metal and mineral materials for cutting metal and mineral materials, comprising a drive motor which drives a cutting chain around the circumference of a guide bar by means of a drive sprocket. The guide bar has a nose sprocket mounted such that it is able to rotate on the end facing away from the drive sprocket. The cutting chain is guided round part of the circumference of the nose sprocket and has central connecting links which are connected to one another by lateral connecting links. The central connecting links comprise first central connecting links which are configured as drive links and each have a drive tooth. Each first central connecting link is positioned adjacent to a first area of the circumference of the nose sprocket as it runs around the nose sprocket. The first area has a first recess in which the drive tooth of the first central connecting links engages as it runs round the nose sprocket.

The invention further relates to a hand-operated implement for cutting metal and mineral materials, comprising a drive motor which drives a cutting chain around the circumference of a guide bar by means of a drive sprocket. The cutting chain is guided round part of the circumference of the drive sprocket and has central connecting links which are connected to one another by lateral connecting links. The central connecting links comprise first central connecting links which are configured as drive links and each have a drive tooth. Each first central connecting link is positioned adjacent to a first area of the circumference of the drive sprocket as it runs around the drive sprocket. The first area has a first recess in which the drive tooth of the first central connecting links engages as it runs round the drive sprocket.

A hand-operated implement, namely a stone cutter, which drives a cutting chain around a guide bar is known from U.S. Pat. No. 6,186,136 B1. The cutting chain has drive links with drive teeth of identical design which engage in corresponding recesses as they run round a drive sprocket of the stone cutter. The shape of the drive teeth corresponds to the shape of the drive teeth in saw chains such as those used to cut wood, for example. As a result it is in principle possible to drive a saw chain for cutting wood with the stone cutter. This is not desirable.

The object of the invention is to create a cutting chain for a hand-operated implement for cutting metal and mineral materials which can be driven by the hand-operated implement for cutting metal and mineral materials. A further object of the invention is to create a hand-operated implement for cutting metal and mineral materials which can be used exclusively to cut metal or mineral materials.

SUMMARY OF THE INVENTION

The object as it relates to the cutting chain is achieved by a cutting chain that has second central connecting links with drive teeth which are shaped differently to the drive tooth on the first central connecting links or are positioned a different distance from the leading drive tooth or have no drive tooth.

The object as it relates to the hand-operated implement for cutting metal and mineral materials is achieved by a hand-operated implement that has a cutting chain having second central connecting links which are positioned adjacent to a second area of the circumference of the nose sprocket as they run around the nose sprocket and that the second area has a blocking contour which prevents a drive tooth on a first central connecting link from engaging fully in the second area.

The object is further solved by a hand-operated implement for cutting metal and mineral materials in that the implement has a cutting chain having second central connecting links which are positioned adjacent to a second area of the circumference of the drive sprocket as they run around the drive sprocket and the second area has a blocking contour which prevents a drive tooth on a first central connecting link from engaging fully in the second area.

A cutting chain for a hand-operated implement for cutting metal and mineral materials, in particular for a stone cutter, comprises first central connecting links which are designed as drive links and each have a drive tooth. The cutting chain also has second central connecting links with drive teeth which are shaped differently to the drive teeth of the first central connecting links, are located a different distance from the leading drive teeth or have no drive teeth. The cutting chain can thus be fitted on an implement with a drive sprocket which has first areas with recesses for the drive teeth of the first central connecting links and second areas with no recesses or with recesses for the drive teeth of the central connecting links. The cutting chain can also be fitted on an implement with a guide bar which has a nose sprocket with recesses matched to the cutting chain. In this arrangement the nose sprocket advantageously has first areas with recesses for the drive teeth of the first central connecting links and second areas with no recesses or with recesses for the drive teeth of the second central connecting links.

The implement is designed primarily for cutting mineral materials such as stone or concrete. However, the implement is also able to cut through metal materials, in particularly metal materials embedded in mineral materials such as reinforcing rods in concrete.

Advantageously, only the central connecting links have drive teeth. The drive teeth on the second central connecting links are advantageously smaller in volume than the drive teeth on the second central connecting links. The volume of the drive teeth on the second central connecting links is advantageously no more than approximately 75% and in particular no more than approximately 50% of the volume of the drive teeth on the first central connecting links. The drive teeth on the second central connecting links advantageously have a smaller surface area than the drive teeth on the first central connecting links. The surface area of the drive teeth on the second central connecting links is advantageously no more than approximately 75% and in particular no more than approximately 50% of the surface area of the drive teeth on the first central connecting inks. In this arrangement the surface area and the volume of the drive teeth refer to the surface area encompassed by the external contour and the volume encompassed by the external contour respectively. Any openings or recesses in the surface of the drive teeth are not taken into account in determining the surface area or volume and thus do not reduce the surface area or volume of the drive teeth.

In particular, the second central connecting links have at least one recess on their leading and/or trailing flanks into which projects a blocking contour on the drive sprocket. It may be advantageous for the drive teeth on the second central connecting links to be shorter along the length of the cutting chain than the drive teeth on the first central connecting links. It may also be advantageous for the drive teeth on the second central connecting links to be narrower in at least one area than the drive teeth on the first central connecting links. The width of the drive teeth on the second central connecting links is advantageously no more than approximately 75% and in particular no more than approximately 50% of the width of the drive teeth on the first central connecting links. In this arrangement the width is measured parallel to the longitudinal central axis of the connecting pins on the cutting chain, i.e. transversely in relation to the cutting chain. The contour of the drive teeth on the first central connecting links advantageously completely covers the contour of the drive teeth on the first central connecting links. If the first and second central connecting links are placed on top of one another such that the openings for the connecting pins lie on top of one another, at no point does the drive tooth on the second central connecting link project beyond the drive tooth on first central connecting link. The second central connecting links can be produced from the first central connecting links by removing a section from the drive teeth on the first central connecting links.

The drive teeth on the first and second central connecting links are advantageously located different distances from the leading central connecting link. This produces a different configuration of connecting links in the different areas of the drive sprocket. The recesses in the drive sprocket are advantageously positioned at correspondingly different distances from one another. The position of the recesses is not suitable for a cutting chain with identical distances between the drive teeth, and the recesses and/or the outer circumference of the drive sprocket form a blocking contour.

The cutting chain advantageously has at least two cutting segments which engage with the workpiece. In this arrangement the cutting segments are advantageously fixed to lateral connecting links. In particular, each cutting segment is connected fast to two connecting links positioned side by side at right angles to the length of the cutting chain. At least one central connecting link advantageously has a projection which extends in the area positioned between two successive cutting segments along the length of the cutting chain. The area of the cutting chain positioned between two cutting segments is supported on the work piece. Without this projection the cutting chain can be moved towards the workpiece between two cutting segments, in particular along a workpiece edge. In such an arrangement the front face of next cutting segment would be able to hit the workpiece causing severe vibrations during operation. The impacts would be transferred to a tensioning element on the guide bar and the tensioning bar thus subjected to a high mechanical strain. The vibrations would also increase wear on the cutting chain. A projection positioned between two successive cutting segments is able to reduce vibrations, strain on the tensioning element and wear. A projection is advantageously positioned between all cutting segments. In particular, all central connecting links have a projection. Advantageously a cutting segment is fixed to at least 80% of lateral connecting links.

At least two connecting links positioned adjacent to one another along the length of the cutting chain can be designed as locking links which have no cutting segments. The locking links advantageously have a supporting section instead of a cutting segment. In this arrangement the supporting sections on adjacent locking links are advantageously designed separate from one another such that each locking link can be removed from the connecting pin outwards during unriveting. As a result the cutting chain can also be opened and closed easily if the connecting pin is designed as a collar stud. In particular, all the lateral connecting links except the locking links are connected to a cutting segment. To make the design of the cutting chain more cost-effective it is possible to increase the number of locking links, i.e. the number of lateral connecting links without cutting segments.

A guide bar with a nose sprocket mounted at the nose of the guide bar such that it is able to rotate on the end facing away from a drive sprocket is positioned on a hand-operated implement for cutting mineral or metal material. The nose sprocket serves to guide the cutting chain around the tip of the guide bar. The nose sprocket has different first and second areas around its circumference. The first areas serve to engage the drive teeth of a cutting chain. They are advantageously designed like the drive teeth on standard saw chains. The blocking contour in the at least one second area prevents the drive tooth on the first central connecting link from being able to engage in the second area in the nose sprocket. As a result it is impossible to fit a saw chain in which all the drive teeth are designed like the drive teeth on the first central connecting links on the guide bar. As the drive tooth is unable to engage in the second area, it is immediately apparent to the operator that the saw chain is not suitable for the hand-operated implement for cutting mineral or metal material. Due to the positioning of a blocking contour in the second area, only a cutting chain with central connecting links matched to the shape of the first and second areas can be fitted on the guide bar. The sequence of the first and second central connecting links must also be matched to the sequence of the first and second areas. As a result only a special cutting chain matched to the nose sprocket on the guide bar of the implement can be fitted on the guide bar.

To prevent it being possible to fit a guide bar with a nose sprocket with only a first area on the implement, the cross-section of a tensioning element on a chain tensioning device advantageously has a special cross-sectional shape which prevents a guide bar for a saw chain being fitted. Tensioning elements such as tensioning pins for guide bars ordinarily have a round cross-section and project into a round opening in the guide bar. The cross-section of the tensioning element of the implement for cutting metal and mineral materials advantageously forms a blocking contour for the opening in an ordinary guide bar for a saw chain. The tensioning element on the implement for cutting metal and mineral materials advantageously has a non-circular cross-section in the area which engages in the opening. In this arrangement the cross-section of the tensioning element is advantageously designed such that it cannot be inserted into a standard opening in a guide bar for a saw chain. The cross-section of the tensioning element is advantageously designed to be larger than the cross-section of a tensioning element on an ordinary hand-held power saw. This larger cross-section results in increased mechanical stability.

The first area and the second area advantageously extend over approximately the same circumferential angle at the circumference of the nose sprocket. The nose sprocket is thus divided evenly into the first and second areas. This means that the first and second central connecting links on the cutting chain can be of approximately the same size. The nose sprocket advantageously has at least two second areas. The two second areas are advantageously positioned on the nose sprocket so as to ensure that at least one second connecting link is positioned on the nose sprocket irrespective of the nose sprocket position. Any attempt to fit the wrong chain is thus remarked immediately since at least one drive tooth is positioned adjacent to a second area. A particularly advantageous design is achieved when the central connecting links are configured as alternating first central connecting links and second central connecting links along the length of the cutting chain. This ensures that a plurality of second central connecting links is always positioned at the nose sprocket, thereby reliably prevent an inappropriate tool from being fitted on the nose sprocket.

The second central connecting links advantageously have a guide which engages in the guide bar. This ensures that the cutting chain is guided correctly along its entire length. The height of the guide measured perpendicular to the length of the cutting chain is advantageously less than the height of the drive tooth measured perpendicular to the length of the cutting chain. This allows a lower recess to be formed in the second areas than in the first areas of the nose sprocket. A blocking contour is thus achieved by simple means. In this arrangement the height of the drive tooth and the guide is measured to the underside of an adjacent lateral connecting link with the chain extended. The underside of a lateral connecting link is the side adjacent to the guide bar. A simple design is achieved if the shape of the guide is the same as the shape of a section of the drive tooth. To produce the second central connecting links is thus sufficient merely to remove a section from the first central connecting links. The second central connecting links can thus be produced simply. The blocking contour advantageously extends almost to the circumference of the nose sprocket such that it is easily visible to the operator. The blocking contour is advantageously formed on a second recess positioned in the second area and is shaped to match the second central connecting links. Additionally or alternatively, the position of the second recess can be matched to the position of the second central connecting links. A blocking contour can thus be created simply, either by changing the position or by changing the shape of the recess.

It is also possible for the second central connecting links not to have a section which engages in the nose sprocket. The nose sprocket then advantageously has no recess in the second areas.

In addition to the nose sprocket, the drive sprocket also advantageously has first and second areas. The recesses in the drive sprocket which serve to drive the cutting chain are advantageously designed like the recesses in the nose sprocket. The drive sprocket has at least one first area positioned adjacent to a first central connecting link as the cutting chain runs around the drive sprocket. The drive sprocket also has at least one second area positioned adjacent to a second central connecting link as the cutting chain runs around the drive sprocket. The first area has a recess in which the drive tooth engages. To prevent a cutting chain which is not suitable for the implement from being fitted on the drive sprocket, the second area has a blocking contour which prevents the drive tooth on a first central connecting link from engaging fully in the second area. It is therefore impossible to fit a cutting chain which has only first central connecting links with drive teeth on the drive sprocket. This simply prevents a cutting chain not intended for the tool from being driven. The blocking contour advantageously extends almost to or beyond the circumference of the drive sprocket such that the blocking contour is clearly visible to the operator. This facilitates the fitting of the cutting chain on the drive sprocket. At least some of the lateral connecting links advantageously have cutting elements. In particular all the lateral connecting links have cutting elements, one such cutting element being positioned on both the lateral connecting links adjacent to one another.

The drive sprocket is advantageously positioned such that it is unable to rotate but able to move axially on a drive element which is driven rotationally by the drive sprocket. Due to its axial mobility the drive sprocket can be dismounted easily. The drive sprocket is advantageously not fixed to the drive element axially in relation to the axis of rotation. To ensure that the drive sprocket is unable to slip off the drive element during operation, the implement, in particular the stone cutter, has a chain sprocket cover which covers the drive sprocket and the chain sprocket has a blocking contour which secures the drive sprocket to the drive element in the direction of the axis of rotation of the drive sprocket. When the chain sprocket cover is fitted, the drive sprocket is thus held securely to the drive element. When the chain sprocket cover is fitted the drive sprocket is thus held securely to the drive element. In this arrangement the drive sprocket is able to move axially along a short path of travel during operation. As soon as the chain sprocket cover is removed, to change the cutting chain or for maintenance for example, the drive sprocket can be taken off the drive element axially in relation to the axis of rotation easily without having to remove any further fixing elements. The drive sprocket can thus be changed more simply and more quickly. The drive element is advantageously connected fast to the clutch drum of a centrifugal clutch. Making the drive sprocket detachable from the clutch drum means that it is unnecessary to dismount the clutch drum to change the drive sprocket, thereby preventing dirt from penetrating the centrifugal clutch.

The drive sprocket has an entraining dog which connects it to the drive element such that it is unable to rotate. The contour is advantageously designed such that it is impossible to fit a drive sprocket designed to drive a chain unsuitable for cutting metal and mineral materials, such as a drive sprocket for driving a saw chain, for example, to the drive element. The entraining contour can be a splined shaft section, the drive sprocket having a predetermined number of grooves and the drive element the same number of matching ridges. The entraining contour is advantageously a special contour which differs from common contours in terms of number of recesses, position of recesses and/or internal diameter of the drive sprocket.

Alternatively or additional, in a hand-operated implement for cutting metal and mineral materials a drive sprocket can have different first and second areas around its circumference, the blocking contour in the at least one second area preventing the drive tooth on the first central connecting link from engaging in the drive sprocket in the second area. This makes it impossible to fit a chain in which all the drive teeth are designed like the drive teeth on the first central connecting links to the drive sprocket. It also prevents an unsuitable chain, in particular a saw chain for cutting wood, from being fitted to the implement.

The drive sprocket of an implement for cutting metal and mineral materials has at least one first area and at least one second area around its circumference, a first recess being positioned in the first area and no recess or a recess of a different shape, in particular a recess shallower than the first recess; being positioned in the second area. The first and second areas extend over the same circumferential angle at the circumference of the drive sprocket. The first and second areas are thus areas adjacent to which central connecting links are positioned when a cutting chain is fitted to the implement. The shape of the second area can prevent a chain with only first central connecting links which is not intended for the implement from being fitted in error.

The second recess is advantageously smaller in volume than the first recess. The volume of the second recess is advantageously no more than approximately 75% of the volume of the first recess. In particular, the surface area of the second recess in a sectional plane perpendicular to the axis of rotation of the drive sprocket is smaller than the surface area of the first recess, the surface area of the second recess in particular being approximately 75% of the surface area of the first recess. A drive tooth on a first central connecting link can thus be prevented from engaging fully in a simple manner. Additionally or alternatively, it is also possible for the width of the second recess measured parallel to the axis of rotation of the drive sprocket to be smaller than the width of the first recess. The width of the second recess is advantageously no more than approximately 75% of the width of the first recess.

BRIEF DESCRIPTION OF THE DRAWINGS

Embodiments of the invention are explained below with reference to the drawings.

FIG. 18 shows a side view of an embodiment of cutting chains.

FIG. 19 shows a side view of an embodiment of cutting chains.

FIG. 20 shows a perspective view of the cutting chain illustrated in FIG. 19.

FIG. 21 shows a section through the cutting chain illustrated in FIG. 19.

FIG. 26 shows a side view of the guide bar in the direction of arrow XXVI as shown in FIG. 24.

FIG. 27 shows a perspective view of a tensioning pin of the stone cutter.

FIG. 28 shows a side view of the tensioning pin shown in FIG. 27.

FIG. 29 shows a side view of the tensioning pin in the direction of arrow XXIX as shown in FIG. 28.

FIG. 30 shows a side view of the tensioning pin in the direction of arrow XXX as shown in FIG. 28.

FIG. 31 shows a side view of the tensioning pin in the direction of arrow XXXI as shown in FIG. 29.

DESCRIPTION OF PREFERRED EMBODIMENTS

Figure 1:
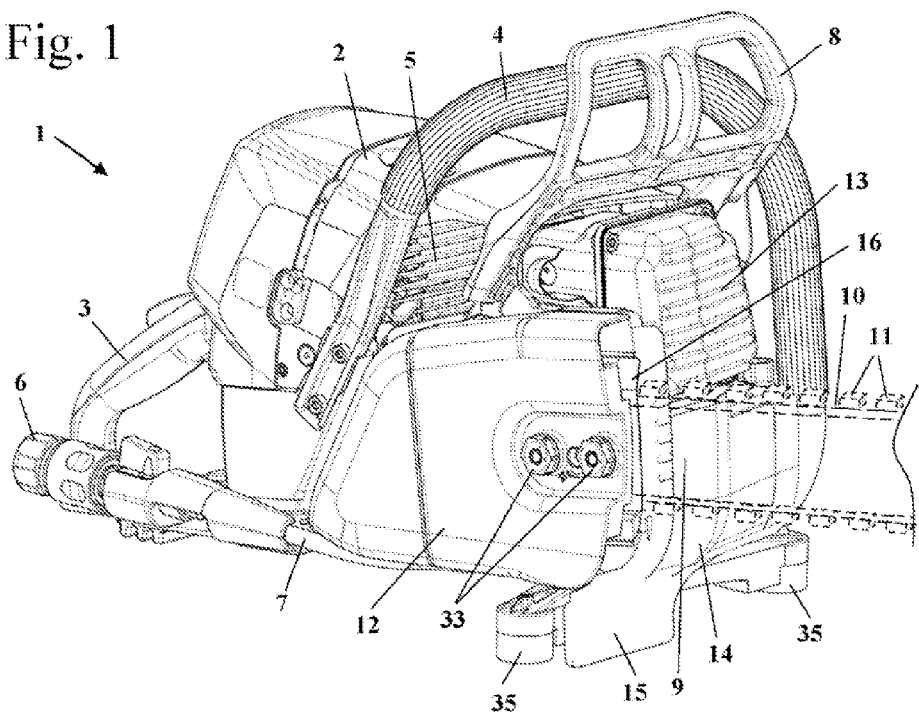
FIG. 1 shows a perspective view of a stone cutter with a schematically illustrated guide bar and cutting chain.

FIG. 1 shows an embodiment of a hand-operated implement for cutting metal and mineral materials in the form of a stone cutter 1 comprising a housing 2 on which are arranged a rear handle 3 and a handlebar 4. The implement is particularly suitable for cutting mineral materials but can also be used to cut metal materials, in particular metal materials embedded in mineral materials. The implement may also be another implement suitable for cutting mineral and/or metal materials. Arranged in the housing 2 is a drive motor 5 which is insulated from the handles 3 and 4 in the usual way so as to reduce the transmission of vibrations. Adjacent to the rear handle 3 is a water connection 6 for connecting an external water supply. A water hose 7 leads from the water connection 6 into the housing 2. The water hose 7 supplies water to a guide bar 9 which is fixed to the housing 2 and to a cutting chain 10 configured such that it runs around the guide bar 9, thereby washing detached particles of stone away from the guide bar 9 and simultaneously cooling the cutting chain 10. The cutting chain 10 has cutting elements 11 which are suitable for cutting metal and mineral materials and which in the embodiment are approximately cuboid with a rounded top. The term "cutting" is used in its broadest sense and may include grinding and other forms of cutting off. Arranged adjacent to the front of the stone cutter 1 is the exhaust gas silencer 13 of the drive motor 5 which takes the form of an internal combustion engine. The drive motor 5 may also be an electric motor which can be supplied with power by an electric cable; for example; or a battery, in particular an accumulator battery.

Figure 2:
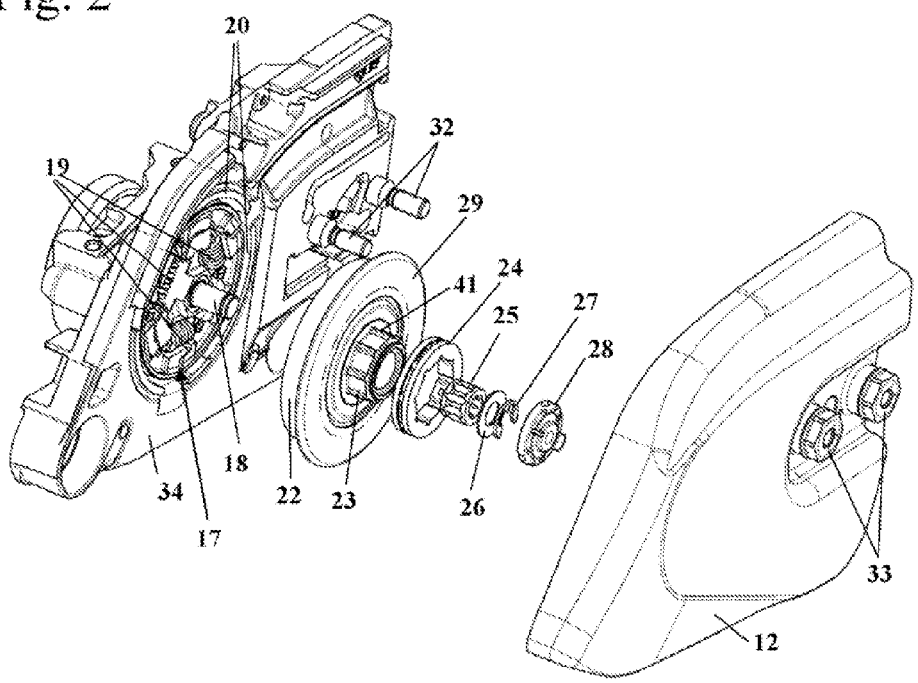
FIG. 2 shows an exploded view of the area of the drive sprocket of the stone cutter shown in FIG. 1.

A hand guard 8 which is connected fast to the housing 2 extends above the exhaust gas silencer 13. A guard 14 with a splashguard 15 is arranged on the front of the housing 2. The splashguard 15 is arranged adjacent to the section of the cutting chain 10 which runs back from the tip of the guide bar 9 to the stone cutter 1, and prevents the stone cutter 1, particularly the area of a chain sprocket cover 12 arranged on the housing 2, from becoming excessively dirty. The chain sprocket cover 12 is fixed to the housing 2 by fixing nuts 33. The guide bar 9 is clamped between the chain sprocket cover 12 and a side plate 16 arranged on the housing 2. As shown in FIG. 2, the fixing nuts 33 are screwed onto fixing bolts 32 which are fixed to a part 34 of the housing 2.

FIG. 2 shows the structure of the drive of the cutting chain 10 in detail. The drive motor 5 (not illustrated in FIG. 2) has a crankshaft 18 on which is arranged a centrifugal clutch 17. The centrifugal clutch 17 is fixed to a part 34 of the housing 2 of the stone cutter 1 which also delimits the crankcase of the drive motor 5. The centrifugal clutch 17 has flyweights 20 which are pre-tensioned radially inwards in relation to the axis of rotation (not illustrated in FIG. 2) of the crankshaft 18 by means of springs 19. Once clutch engagement speed is reached, the flyweights 20 come in contact with the inside of a clutch drum 22 and connect the clutch drum 22 to the crankshaft 18 such that it is unable to rotate. The outward facing front face of the clutch drum 22 is covered by a cover 29 which prevents water, dirt and mud from penetrating the area of the centrifugal clutch 17. Fixed to the outward facing face of the clutch drum 22 is a splined shaft 23 which in the embodiment has eight teeth 41. A drive sprocket 24 is placed on the splined shaft 23. The cutting chain is guided around the drive sprocket 24.

The clutch drum 22 is supported on the crankshaft 18 such that it is able to rotate by a roller bearing, namely a needle bearing. A washer 26 which is fixed to the crankshaft 18 by a circlip 27 provides an axial seal. Fixed on the front face of the splined shaft 23 is a cap 28 which seals the bearing of the clutch drum 22 and prevents the penetration of dirt, in particular mud formed from the water and grit created by the stone cutter 1 during operation.

Figure 3:
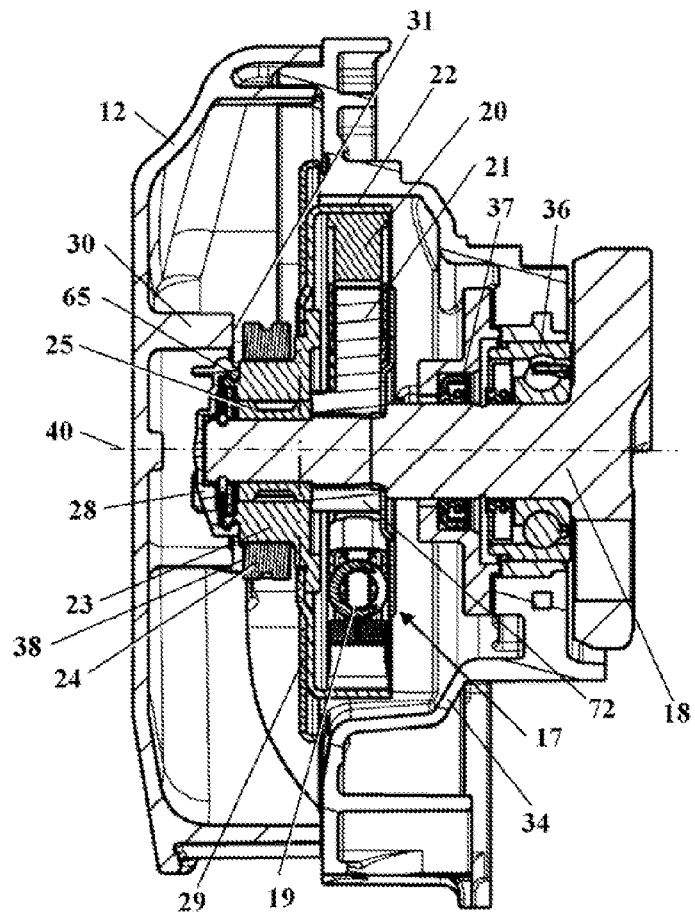
FIG. 3 shows a section through the area of the drive sprocket of the stone cutter.

As shown in FIG. 3, the cap 28 is clipped onto a groove 65 in the crankshaft 18. FIG. 3 also shows one of the arms 21 of the centrifugal clutch 17 on which a flyweight 20 is mounted such that it can be moved radially. Each flyweight 20 is supported on an arm 21. The arms 21 are formed on a carrier 72 which is connected to the crankshaft 18 such that it is unable to rotate. As also shown in FIG. 3, the crankshaft 18 is mounted in a part 34 of the housing 2 by means of a bearing 36. A seal 37 seals it from the exterior. FIG. 3 also shows the axis of rotation 40 of the crankshaft 18 and drive sprocket 24.

The drive sprocket 24, which in the embodiment takes the form of a spur chain sprocket, is arranged on the splined shaft 23 such that it is unable to rotate but can be moved freely axially. To secure the drive sprocket 24 axially, the chain sprocket cover 12 has on the side facing the drive sprocket 24 an annular projection 30, the front face 31 of which is positioned adjacent to the front face 38 of the drive sprocket 24. A small gap is formed between the drive sprocket 24 and the annular projection 30 such that the drive sprocket 24 is able to move on the splined shaft during operation. However, the annular projection 30 prevents the drive sprocket 24 from slipping off the splined shaft 23 completely, thereby fixing the drive sprocket 24 in a simple manner. As soon as the chain sprocket cover 12 is removed, the drive sprocket 24 can be taken off the splined shaft 23 and replaced, for example.

Figure 4:
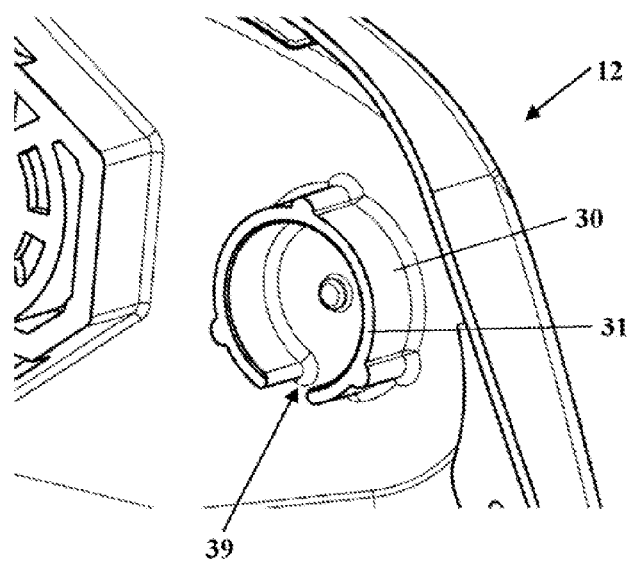
FIG. 4 shows a perspective view of a section of the chain sprocket cover of the stone cutter.

FIG. 4 shows the configuration of the annular projection 30 in detail. The annular projection 30 has an opening 39 on what is its underside in normal operation. This permits any water or mud penetrating the annular projection 30 to run away as soon as the stone cutter 1 is placed in its usual set-down position. The usual set-down position of the stone cutter 1 is shown in FIG. 1. In the set-down position, the stone cutter 1 is placed with the feet 35 shown in FIG. 1 on a flat surface.

Figure 5:
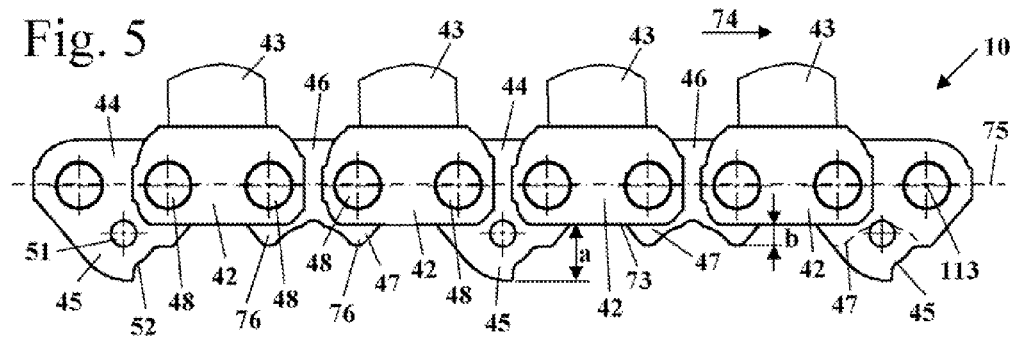
FIG. 5 shows a side view of a section of the cutting chain of the stone cutter.

FIG. 5 shows the configuration of the cutting chain 10 in detail. The cutting chain 10 is made up of central connecting links 44, 46 which are connected together by lateral connecting links 42. All the links of the cutting chain 10 are connected together in an articulated manner by connecting pins 48. First central connecting links 44 and second central connecting links 46 alternate along the length 75 of the cutting chain 10. The first central connecting links 44 are designed as drive links and each has a drive tooth 45 which projects into a groove formed in the guide bar 9. The first central connecting links 44 are driven by the drive sprocket 24 at the drive tooth 45. Each drive tooth 45 has on its front face in the direction of travel 74 a notch 52 which is shaped such that any mud and dirt which collects in the guide bar 9 is also carried along by the drive teeth 45. The drive teeth 45 also have a hole 51 which serves to improve water distribution. The hole 51 is not taken into account in determining the surface area or the volume of the drive tooth 45 and therefore reduces neither the surface area nor the volume. The drive teeth 45 have a height a measured perpendicular to the length 75. The length 75 is the line connecting the connecting pins 48 which cuts through the centre of the connecting pins perpendicular to their longitudinal central axis 113. The height a is thus measured perpendicular to the external circumference of the guide bar 9. The height a corresponds to the depth to which the drive tooth 45 is able to engage in the guide bar 9 or drive sprocket 24. The height a is measured to the underside 73 of the adjacent lateral connecting link 42 when the cutting chain 10 is extended, the underside 73 of the lateral connecting link being the side facing the guide bar 9 during operation.

The second central connecting links 46 do not have fully formed drive teeth. Instead the second central connecting links 46 have a guide 47 which is shaped like an upper section of the drive teeth 45. The guide 47 comprises two tooth-shaped guide sections 76 each arranged beneath a connecting pin 48. The guide 47 has a height b measured to the underside 73 of the adjacent lateral connecting links 42 perpendicular to the length 75. Height b is clearly smaller than height a. Height b is advantageously no more than 75% and in particular no more than 50% of height a. Height b may, for example, be approximately one third to approximately half of height a. The drive teeth 45 and the guides 47 are the areas of the connecting links 44 and 46 which lie below the line connecting the undersides 73 of the lateral connecting links 42 when the cutting chain 10 is in the extended position as shown in FIG. 5. The guides 47 have a clearly smaller surface area and, as all the central connecting links 44 and 46 are of the same width, a clearly smaller volume than the drive teeth 45. Here the surface area and the volume refer to the surface area and the volume encompassed by the outline. Openings inside the outline such as the hole 51 are not taken into account in determining the surface area or the volume of the drive teeth 45. The volume of the guides 47 is advantageously no more than 75% and in particular no more than 50% of the volume of the drive teeth 45. The surface area of the guides 47 is advantageously no more than 75% and in particular no more than 50% of the surface area of the drive teeth 45.

The guide 47 which forms the drive tooth of the connecting link 46 can be made from the drive tooth 45 by removing the lower area. As shown by the broken line in the drive tooth 45 on the right of FIG. 5, the outline of the guide 47 lies wholly within the outline of the drive tooth 45. The outline of the drive tooth 45 covers the outline of the guide 45 completely when the first central connecting link 44 is placed on top of the second central connecting link 46.

The lateral connecting links 42 each have a cutting segment 43. In this arrangement each cutting segment 43 is connected fast to two connecting links which are adjacent to one another in the direction of travel 74 such that the cutting segments 43 project beyond the entire width of the cutting chain 10 and overlap partly with the central connecting links 44 and 46.

Figure 6:
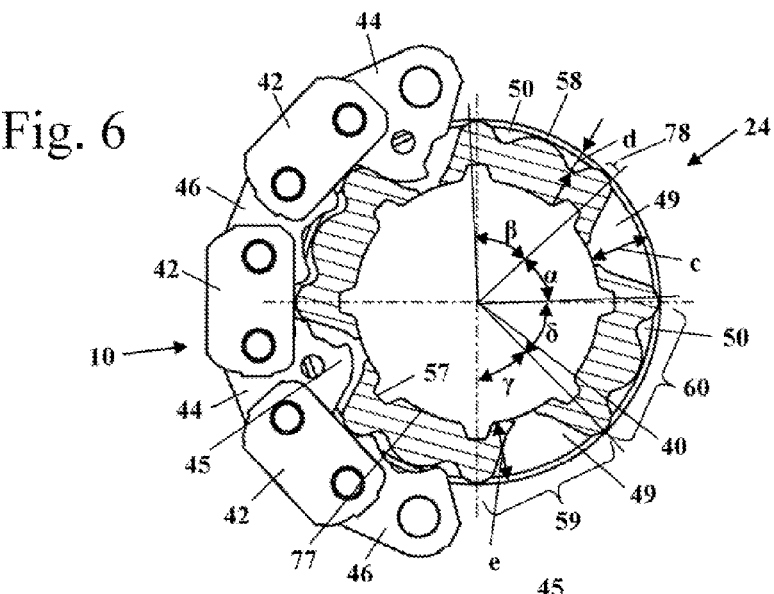
FIG. 6 shows a section through the drive sprocket with the cutting chain fitted.

FIG. 6 shows the configuration of a section of the cutting chain 10 on the drive sprocket 24. The drive sprocket 24 has around its circumference first areas 50 and second areas 60. The first areas 50 extend about the axis of rotation 40 over an angle $\gamma$ at the circumference of the drive sprocket 24, while the second areas 60 extend over an angle $\delta$ at the circumference of the drive sprocket 24. The angles $\gamma$ and $\delta$ are approximately equal and in particular identical. The drive sprocket 24 has a total of four first areas 59 and four second areas 60, with all the areas 59, 60 covering 45° at the circumference of the drive sprocket 24. First recesses 49 shaped essentially like the drive teeth 45 are arranged in the first areas 59. The recesses 49 are slightly larger than the drive teeth 45 so the drive teeth 45 lie loose in the recesses 49 when the cutting chain 10 is not being driven.

The second areas 60 each have two recesses 50 shaped like the guides 47. The recesses 50 are formed of two deeper areas which are connected together, each deeper area matching a guide section 76 and a central area of only a minimal depth or of no depth at all extending between the deeper areas. In the central area the base of the recess 50 can extend to the outer circumference of the drive sprocket 24 or to close to the outer circumference. The central area of the base of the recess 50 can also project slightly beyond the outer circumference of the drive sprocket 24. The base of the recess 50 forms a blocking contour 58 which prevents a drive tooth 45 from engaging completely in the recess 50.

The recesses 49 have a depth c which in the embodiment correspond to the total thickness e of the drive sprocket measured radially in relation to the axis of rotation 40. The recess 49 thus extends from the inner circumference to the outer circumference of the drive sprocket 24. The recesses 50 have a depth d which is clearly smaller than depth c and only slightly larger than the height b of the guide 47. Depth d is less than approximately 75% and in particular less than approximately 50% of depth c.

The drive teeth 45 have the same width, measured parallel to the length of the connecting pins 48, as the guides 47. Recesses 49 and 50 are therefore of the same width. In the sectional plane shown in FIG. 6, the recesses 50 have a clearly smaller surface area than the recesses 49. The surface area of each recess 50 is less than approximately 75% and in particular less than approximately 50% of the surface area of each recess 49. The volume of the recesses 50 is advantageously less than approximately 75% and in particular less than approximately 50% of the volume of the recesses 49.

The drive sprocket 24 has an inner opening 77 which is provided with internal toothing 57. The internal toothing 57 mates with the teeth on the splined shaft 23. In the embodiment the internal toothing 57 comprises eight grooves distributed evenly around the internal circumference. The internal toothing 57 has a special contour which differs in terms of diameter and in number/arrangement of grooves from common teeth patterns on drive sprockets on other implements such as power saws. This prevents a drive sprocket intended to drive another tool not suitable for cutting metal and mineral materials from being fitted on the splined shaft 23. The eight grooves comprising the internal toothing 57 are positioned in the area between the recesses 49 and 59 such that the recesses located on the inside and outside of the drive sprocket 24 cover each other only slightly radially in relation to the axis of rotation 40, resulting in no or very little additional weakening of the material of the drive sprocket 24 in the area of the recesses in the internal toothing 57 due to the recesses 49 and 50 on the outside. The number of grooves in the internal toothing 57 is advantageously as low as possible in order to reduce the strength of the drive sprocket 24 as little as possible.

As shown in FIG. 6, the cutting chain can be fitted on the drive sprocket 24 such that the first central connecting links 44 are positioned adjacent to the first areas 59 and the second central connecting links 46 are positioned adjacent to the first areas 60. The drive tooth 45 then engages in a corresponding first recess 49 and the guide 47 engages in a corresponding recess 50. Due to the design of the base of the recess 50 as a blocking contour 58, an alternative configuration of the cutting chain 10 such that the first central connecting links 44 are positioned in the second areas is impossible. Similarly, a cutting chain or saw chain which has only first central connecting links 44 with drive teeth 45 cannot be fitted to the drive sprocket 24 since the blocking contours 58 prevent the corresponding drive teeth from engaging.

As shown in FIG. 6, the recesses 49 extend over an angle α around the circumference of the drive sprocket 24 which is somewhat smaller than the angle γ. Between adjacent recesses 49 there is a gap β at the circumference which is somewhat larger than the angle α and also larger than the angles γ and δ. This is due to the fact that the recesses 49 and 50 are not positioned directly adjacent to one another around the circumference of the drive sprocket 24 but that there is a narrow area 78 between the recesses 49 and 50. The recesses 49 do not extend over the whole of the first area 59 and the recesses 50 do not extend over the whole of the second area 60.

Figure 7:
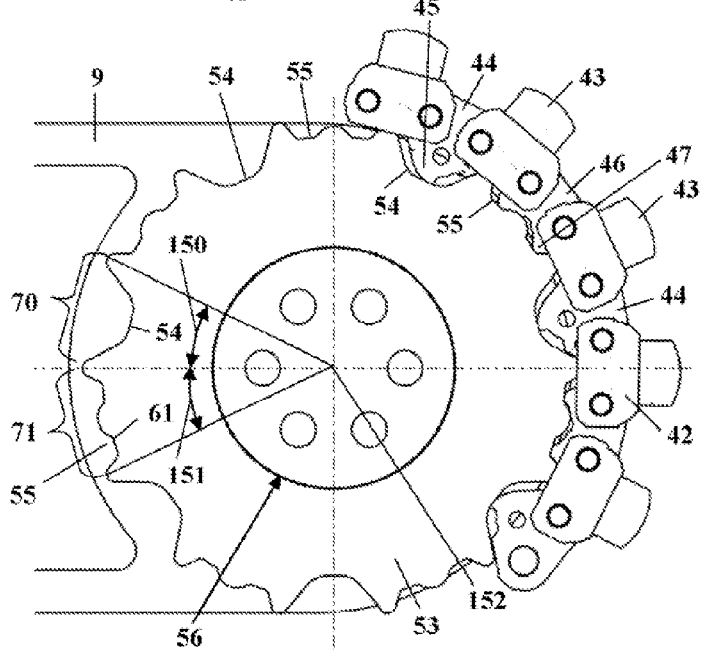
FIG. 7 shows a side view of the nose sprocket of the guide bar with the cutting chain fitted.

FIG. 7 shows a nose sprocket 53 positioned at the free end of the guide bar 9. The circumference of the nose sprocket 53 is configured to match the drive sprocket 24. The nose sprocket 53 has first areas 70 with a first recess 54 which are shaped to match the drive teeth 45 and in which the drive teeth 45 engage fully as they run around the nose sprocket 53. The nose sprocket 53 has second areas 71 with second recesses 55 which are shaped to match the drive teeth 45 and in which the guides 47 engage fully as they run around the nose sprocket 53. The first areas 40 extend over an angle 150 at the circumference of the nose sprocket 53. The second areas 71 extend over an angle 151 at the circumference of the nose sprocket 53. In this arrangement the angles 150 and 151 are advantageously approximately the same size, angles 150 and 151 being measured about an axis of rotation 152 of the nose sprocket 53. The base of the second recesses 55 forms a blocking contour 61 which prevents a drive tooth 45 from engaging in the second recess 55. As shown in FIG. 7, the nose sprocket 53 is mounted such that it is able to rotate on a bearing 56 of known design. The base of the second recesses 55 has a central area in which the area of the base at the tip of the guide bar 9 projects beyond the side plates of the guide bar 9 so that the second recesses 55 are clearly visible to the operator.

The first areas 70 and the second areas 71 are positioned alternately around the circumference of the nose sprocket 53. The first recesses 54 are designed to match the first recesses 49 in the drive sprocket 24 and the second recesses 55 correspond in essence to the second recesses 50. The configuration of the drive sprocket 24 prevents a cutting chain not intended for the stone cutter from being fitted. It is therefore also possible for the drive sprocket 24 to be provided with only first recesses 54 such that the first central connecting links 44 can be arranged in any position on the nose sprocket 53.

Figure 8:
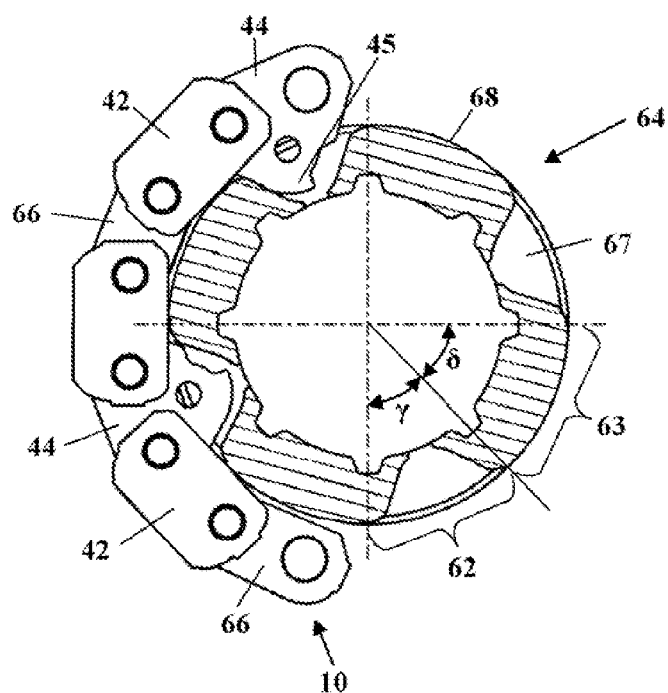
FIG. 8 shows a section through an embodiment of a drive sprocket with the cutting chain fitted.

FIG. 8 shows an embodiment of a drive sprocket 64. The drive sprocket 64 has first areas 62 in which the first recesses 67 are positioned. The shape of the first recesses 67 is the same as that of the first recesses 49 on the drive sprocket 24. The drive teeth 45 on the first central connecting links 44 engage essentially fully in the first recesses 67 as they run around the drive sprocket 64. The drive sprocket 64 has second areas 63 positioned circumferentially between two first areas 62. The second areas 63 have no recess at the circumference. The cutting chain 10 has two central connecting links which have no drive teeth and no guides. The second central connecting links are formed on the side facing the drive sprocket 64 and do not project into the area of the drive sprocket 64. The two areas 63 form a blocking contour 68 which prevents the drive teeth 45 from engaging. Due to the fact that there is no recess in the drive sprocket 64 in the second areas 63, it is impossible to fit a cutting chain which has only first central connecting links 44 with drive teeth 45 on the drive sprocket 64. The further design and dimensions of the drive sprocket 64 are identical to those of the drive sprocket 24.

It is also possible for the second central connecting links to have a drive teeth, albeit shaped differently to the drive teeth 45 on the first central connecting links 44. The drive teeth may be of the same height but have different geometrical shapes such that the blocking contour prevents all drive teeth from engaging fully because, for example, the recesses on the drive sprocket are not in the correct position. Alternative blocking contour configurations can also be advantageous.

Figure 9:
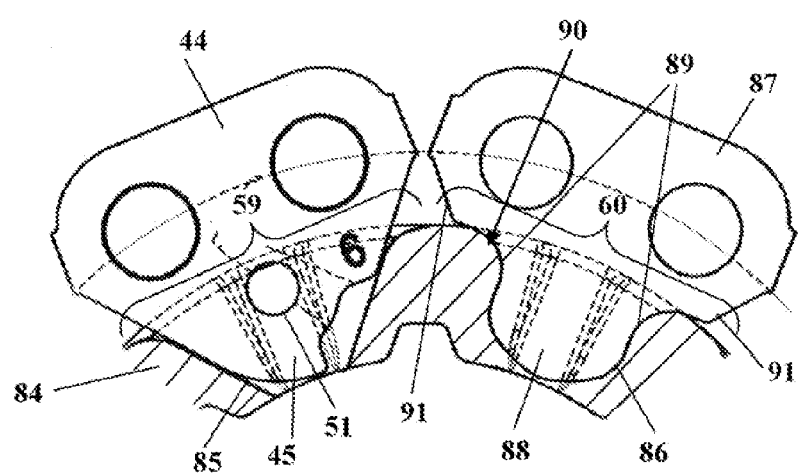
FIG. 9 shows a sectional detail view of an embodiment of a drive sprocket.
Figure 10:
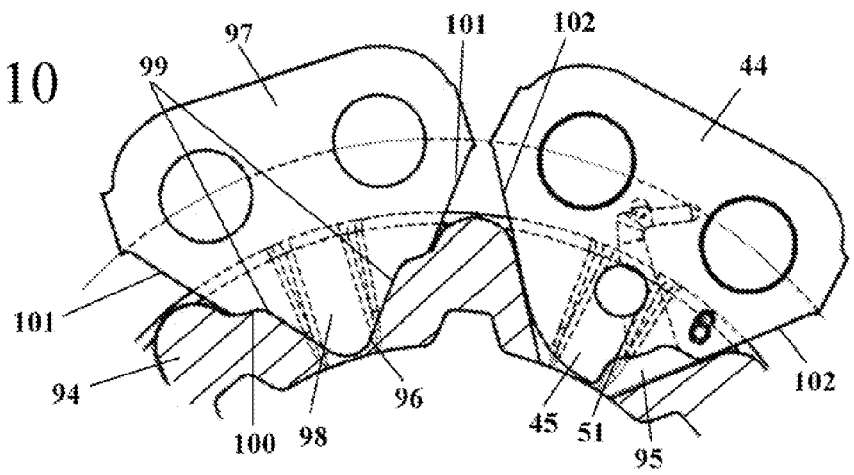
FIG. 10 shows a sectional detail view of an embodiment of a drive sprocket.
Figure 11:
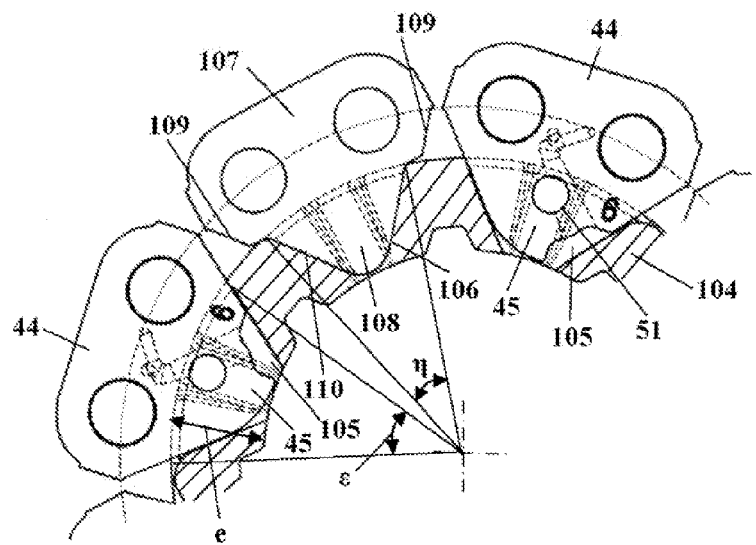
FIG. 11 shows a sectional detail view of an embodiment of a drive sprocket.

In the embodiments shown in FIGS. 9 to 11 different drive teeth are provided on the first and second central connecting links and the drive sprocket has recesses which are differently shaped but with the same depth as the first and second recesses. Elements which are the same as in previous figures are indicated by means of the same reference numbers. The central connecting links are all positioned adjacent to areas of the drive sprocket of the same size.

FIG. 9 shows a section of a section through a drive sprocket 84 which has first recesses 85 and second recesses 86 around its circumference (one of each such recesses being shown). The first and second recesses 85, 86 are positioned alternately around the circumference of the drive sprocket 84 in areas 50 and 60 and have different shapes. A drive tooth 45 on a first central connecting link 44 of a cutting chain engages in each of the first recesses 85 (of which one is illustrated in FIG. 9). The lateral connecting links of the cutting chain are not shown in FIG. 9, but are advantageously designed in the same manner as the lateral connecting links 42 shown in FIGS. 5 and 6. The first central connecting links 44 are the same as the first central connecting links 44 shown in FIGS. 5 and 6. A drive tooth 88 of a second central connecting link 87 of the cutting chain engages in the second recesses 86. The second central connecting links 87 each have on their leading and trailing flanks 91 in the area of the drive teeth 88 a recess 89 into which projects a blocking contour 90 of the drive sprocket 84. The recesses 89 are arc-shaped. The surface area of the drive teeth 88 on the second central connecting links 87 is advantageously no more than approximately 75% and in particular no more than approximately 50% of the surface area of the drive teeth 45 on the first central connecting links 44. The volume of the drive teeth 88 on the second central connecting links 87 is advantageously no more than approximately 75% and in particular no more than approximately 50% of the volume of the drive teeth 45 on the first central connecting links 44. The blocking contour 90 is formed by the base of the second recess 86. The blocking contour 90 prevents a drive tooth 45 of a first central connecting link 44 from being able to engage completely in a second recess 86. The second recesses 86 are smaller than the first recesses 85. Though the recesses 85 and 86 are of the same depth, the second recesses 86 are smaller in volume than the first recesses 85. The volume of the second recesses 86 is advantageously no more than approximately 75% and in particular no more than approximately 50% than the volume of the first recesses 85. In the sectional plane shown in FIG. 9, the surface area of the second recesses 86 is smaller than the surface area of the first recesses 85. The surface area of the second recesses 86 is advantageously no more than 75% and in particular no more than approximately 50% of the surface area of the first recesses 85. In the embodiment shown in FIG. 9, the width of the first recesses 85 and the second recesses 86 is the same. The drive teeth 45 and 88 are also of the same width.

The embodiment shown in FIG. 10 represents a further configuration. Here first central connecting links 44 and second central connecting links 97 are positioned alternately in the direction of travel of the cutting chain. The drive sprocket 94 has first recesses 95 in which the drive teeth 45 on the first central connecting links 33 engage and second first recesses 96 in which the drive teeth 98 on the second central connecting links 97 engage. On their leading and trailing sides the second central connecting links 97 have flanks 101 which are set back in the area which engages in the drive sprocket 94 and which each form a recess 99. The surface area of the drive teeth 98 of the second central connecting links 97 is advantageously no more than approximately 75% and in particular no more than approximately 50% of the surface area of the drive teeth 45 of the first central connecting links 44. The volume of the drive teeth 98 of the second central connecting links 97 is advantageously no more than approximately 75% and in particular no more than approximately 50% of the volume of the drive teeth 45 of the first central connecting links 44. The shape of the second recess 96 is the same as that of the drive teeth 98. In the areas positioned in the recesses 99 the second recess 96 forms a blocking contour 100 which prevents the drive tooth 45 on a first central connecting link 44 from engaging fully in the second recess 96. As the angle between the leading and trailing flank 101 of the drive tooth 98 is the same as the angle between the flanks 102 of the first central connecting links 44, the drive tooth 45 is only able to engage partially in the second central recess 96 until the flanks 102 come to rest against the blocking contour 100. The surface area of the second recess 96 is less than approximately 75% of the surface area of the first recess 95 and the volume of the second recess 96 is less than 75% of the volume of the first recess 95.

FIG. 11 shows an embodiment in which a cutting chain is fitted to a drive sprocket 104 (only the central connecting links on the cutting chain are illustrated). The cutting chain has first central connecting links 44 with drive teeth 45 and second central connecting links 107 which are positioned alternately with the first central connecting links 44 in the direction of travel of the cutting chain. The drive teeth 45 on the first central connecting links 44 engage in first recesses 105 and the drive teeth 108 in the second central connecting links 107 engage in second recesses 106 as they run around the drive sprocket 104. The second recesses 106 are narrower around the circumference of the drive sprocket 104 than the first recesses 105. The first recesses 105 extend around the circumference of the drive sprocket 104 over an angle $\epsilon$ and the second recesses 106 extend over an angle $\eta$, both angles $\epsilon$ and $\eta$ being measured about the axis of rotation 40. Here the angle $\eta$ is clearly greater than the angle $\epsilon$. The drive tooth 45 of the first central connecting link 44 is unable to engage fully in the second recess 106. The base of the second recess 106 forms a blocking contour 110 which prevents the drive tooth 45 from engaging fully. As shown in FIG. 11, here too the flanks 109 of the drive tooth 107 are set back in the area which engages in the drive sprocket 104. In the embodiment shown in FIG. 10, the flanks 101 are set back over only part of the section which engages in the drive sprocket 94. In drive link 97 the offset in the flank 101 forms an edge which engages fully in the drive sprocket 94, while in the embodiment shown in FIG. 11 the edge is positioned in the flank 109 in the area of the external circumference of the drive sprocket 104. The surface area of the second recess 106 is less than approximately 75% and in particular less than approximately 50% of the surface area of the first recess 105. The surface area of the drive teeth 108 on the second central connecting links 107 is advantageously no more than 85% and in particular no more than approximately 50% of the surface area of the drive teeth 45 on the first central connecting links 44. The volume of the drive teeth 108 on the second central connecting links 107 is advantageously no more than approximately 75% and in particular no more than approximately 50% of the volume of the drive teeth 45 on the first central connecting links 44.

In the embodiments illustrated in FIGS. 9 to 11 too, the drive tooth 45 on the first central connecting links 44 covers the drive tooth 88, 98, 108 on the corresponding second central connecting link 87, 97, 107 completely if the first central connecting link 45 is placed on the second central connecting link 87, 97, 107. In this arrangement the surface area of the drive tooth 88, 98, 108 of the second central connecting link 87, 97, 107 is smaller than that of the drive tooth 45. Here again the surface area/volume of the hole 51 is not taken into account in determining the surface area/volume of the drive teeth.

Figure 12:
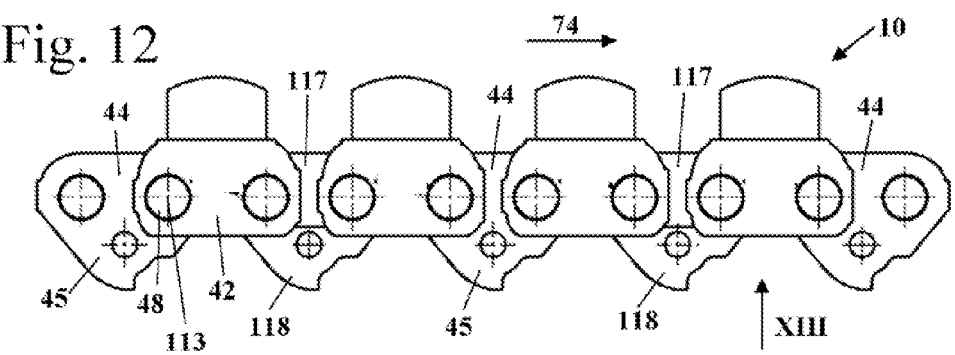
FIG. 12 shows a side view of an embodiment of a cutting chain.
Figure 13:
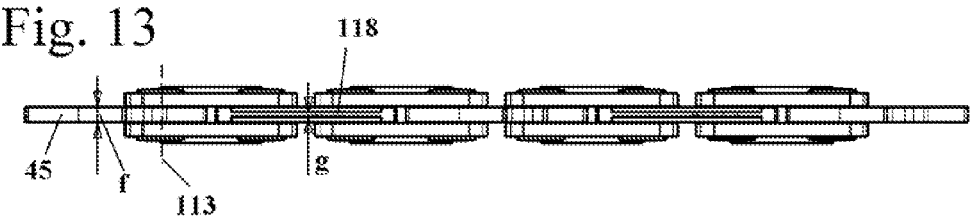
FIG. 13 shows a view in the direction of arrow XIII as shown in FIG. 12.

FIGS. 12 and 13 show a further embodiment of a cutting chain 10 which has first central connecting links 44 and second central connecting links 117. The second central connecting links 117 are positioned alternately with the first central connecting links 44 and each have a drive tooth 118 of reduced width. As shown in FIG. 13, the drive teeth 45 have a width f which is clearly greater than the width g of the drive teeth 118. The width f may, for example, be between 1.5 and 4 times the width g. In this arrangement the widths f and g are measured perpendicular to the direction of travel 74 of the cutting chain parallel to a longitudinal central axis 113 of the connecting pins 48. The surface area of the drive teeth 118 on the second central connecting links 117 is the same size as the surface area of the drive teeth 45 on the first central connecting links 44. Due to the reduced width g, the volume of the drive teeth 118 of the second central connecting links 117 is advantageously no more than approximately 75% and in particular no more than approximately 50% of the volume of the drive teeth 45 of the first central connecting links 45.

Figure 14:
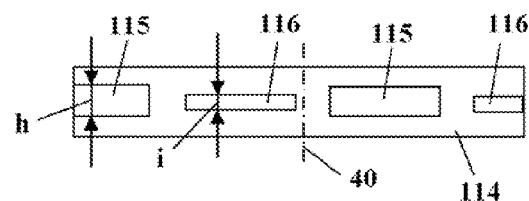
FIG. 14 shows a top view of an embodiment of a drive sprocket.

FIG. 14 shows the drive sprocket 114 corresponding to the cutting chain shown in FIGS. 12 and 13. The drive sprocket has first recesses 115 which have a width h measured parallel to the axis of rotation 40 and second recesses 116 which have a width measured in the same direction which is clearly smaller than the width h. The widths h and i are matched to the widths f and g of the drive teeth 45 and 118. The width i is smaller than the width f such that the drive tooth 45 on a first central connecting link 4 is unable to engage in the second recess 116. The width i of the second recess 116 is less than approximately 75% of the width h of the first recess 115 such that the volume of the second recess 116 is less than 75% of the volume of the first recess 115 despite the two recesses 115 and 116 having the same surface area.

Figure 15:
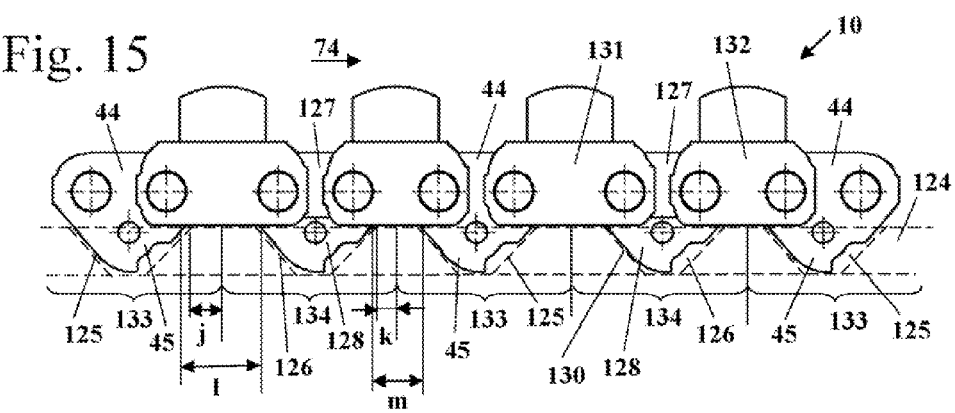
FIG. 15 shows a side view of a cutting chain with a schematically illustrated drive sprocket.

FIG. 15 shows a further embodiment of a cutting chain 10. The cutting chain 10 is fitted on a drive sprocket 124 which is shown schematically in FIG. 15. In FIG. 15 the drive sprocket 124 is shown in a developed view, i.e. as stretched out on a flat surface, for the purposes of illustration. In contrast to the simplified views of the drive sprockets 24 and 64 shown in FIGS. 6 and 8, the drive sprocket 124 is designed as a closed ring. The drive sprocket 124 has first areas 133 and second areas 134. A first recess 125 for the drive tooth 45 on a first central connecting link 44 is positioned in each of the first areas 133 and a second recess 126 for the drive tooth 128 on a second central connecting link 127 is located in each of the second areas 134. The drive teeth 45 and 128 are of the same shape but are positioned differently in the areas 133 and 134. The areas 133 and 134 are of equal size. The areas 133 and 134 are selected such that the recesses 125 and 126 are each positioned centrally in the areas 133 and 134. The areas 133 and 134 therefore terminate centrally between the recesses 125 and 125. Alternative configurations of the areas 133 and 134 may also be appropriate.

The first recesses 125 are located a distance j from the leading end of the area 133 in relation to the direction of travel 74 and the second recesses are located a distance k from the leading end of the area 134. The distance k is clearly smaller than the distance j. The drive teeth 44, 128 are located at correspondingly different distances from their leading drive teeth 44, 128. The drive teeth 128 are located a distance m from the leading drive tooth 45 in relation to the direction of travel 74. The drive teeth 45 are located at a first distance l from the leading drive tooth 128 which is clearly greater than the second distance m (see FIGS. 15 and 17). This is achieved by means of connecting links 131 and 132 with different lateral lengths. The first lateral connecting links 131 are clearly shorter in the direction of travel 74 of the cutting chain 10 than the second lateral connecting chains 132. This results in the different distances between the drive teeth 44 and 128. If the drive teeth 45 on a saw chain with identical distances between the drive links 44, 128 are positioned in the first recesses 125, the side walls of the recesses 126 act as a blocking contour 130 and prevent all the drive links from engaging in the drive sprocket 124. Thus it is possible to prevent the wrong tool being fitted on the stone cutter 1 simply by a configuration of the drive links which differs from the usual configuration.

Figure 16:
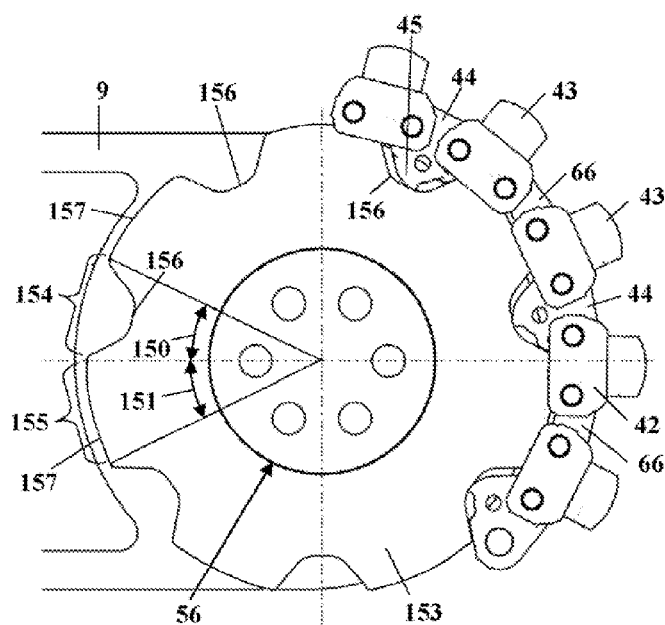
FIG. 16 shows a side view of an embodiment of nose sprocket on the guide bar with the cutting chain fitted.

FIG. 16 shows an embodiment of a nose sprocket 153 on which is fitted the cutting chain 10 illustrated in FIG. 8. The cutting chain 10 has first central connecting links 44 with a drive tooth 45 and second central connecting links 66 which have no drive tooth and no section which engages in the nose sprocket 153. The nose sprocket 153 has around its circumference first areas 154 which extend over an angle 150 at the circumference of the nose sprocket 153 and second areas 155 which extend over an angle 151 at the circumference of the nose sprocket 153. The angles 150 and 151 are advantageously of the same size. The first areas 154 have a recess 156 in which a drive tooth 45 on a first central connecting link 44 is able to engage. The second areas 155 have no recess but a blocking contour 157 which prevents a drive tooth 45 from engaging. The first areas 154 and the second areas 155 are positioned alternately around the circumference of the nose sprocket 153. This means that only a cutting chain 10 that has first central connecting links 44 and second central connecting links 66 positioned alternately along the length of the cutting chain 10 can be fitted on the guide bar 9 with the nose sprocket 153. Another sequence of first areas 154 and second areas 155 and correspondingly arranged first central connecting links 44 and second central connecting links 66 may also be advantageous.

Figure 17:
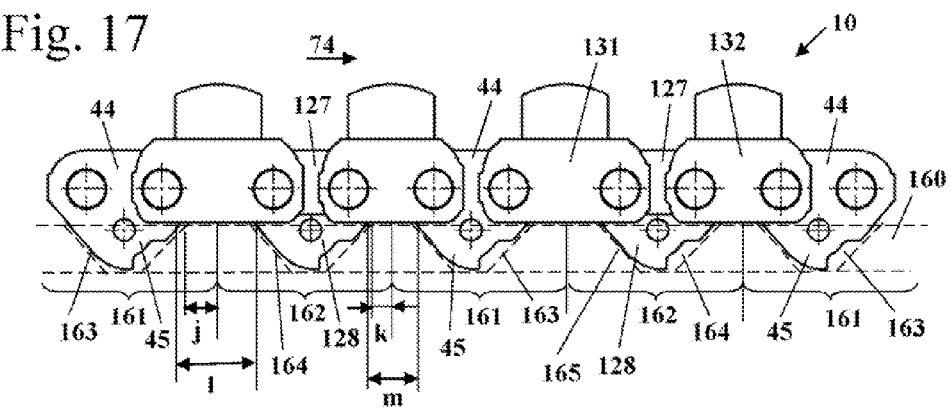
FIG. 17 shows a side view of a cutting chain with a schematically illustrated nose sprocket.

FIG. 17 shows a nose sprocket 160 on which is fitted a cutting chain 10 like the cutting chain 10 shown in FIG. 15. Elements which are identical to those shown in FIG. 15 are indicated by means of the same reference numerals and detailed in the description of FIG. 15. As in FIG. 15, the nose sprocket 160 is illustrated in a developed view. The nose sprocket 160 has first areas 161 with recesses 163 into which project drive teeth 45 on first central connecting links 44. Between each pair of first areas 161 is a second area 162 which has a second recess 164. Drive teeth 128 on second central connecting links 127 project into the second recesses 164. The first areas 161 and the second areas 162 are of equal size and located such that the recesses 163 and 164 are positioned centrally in the areas 161 and 162. The areas 161 and 162 thus extend over the same angle at the circumference of the nose sprocket 160. The recesses 163 and 164 are positioned at different points in the areas 161 and 162. Due to the different distances l and m between the recesses, which correspond to the distances described in FIG. 15, only a cutting chain 10 with drive teeth 45 and 128 at correspondingly different distances and m can be fitted on the nose sprocket 160. On a cutting chain 10 with drive links which are identical distances apart, the side walls of the second recesses 164 act as blocking contours 165. A cutting chain 10 with constant distances between consecutive drive links cannot therefore be fitted on the nose sprocket 160.

FIGS. 18 to 21 show further embodiments of cutting chains 10. The cutting chain 10 shown in FIG. 18 is essentially the same as that illustrated in FIG. 5 and elements which are the same are indicated by means of the same reference numerals. The cutting chain 10 shown in FIG. 18 differs from the cutting chain 10 shown in FIG. 5 in the design of the central connecting links 44 and 46. The first central connecting links 44 have a drive tooth 45 and the second central connecting links 46 have a guide 47. In the design shown in FIG. 18, all central connecting links 44 and 46 have a projection 69 which projects into the area between the leading and trailing cutting segments 43. The projections 69 are somewhat lower than the cutting segments 43. The height of the projections 69 is advantageously approximately the same as the height of the area of the neighbouring cutting segment 43 facing the projection 69. In the embodiment the cutting segments are curved concavely. The height of the projections 69 is approximately the height of the leading upper edge 121 and the trailing upper edge 122 of the cutting segments 43. The cutting chain 10 has a longitudinal axis plane 112 which, when the cutting chain 10 is stretched out, contains all the longitudinal central axes 113 of the connecting pins 48. The cutting segments 43 have a height n measured to this longitudinal axis plane 112. The height n corresponds to the distance between the area of the cutting segments 43 furthest from the longitudinal axis plane 112 and the longitudinal axis plane 112. The projections 69 have a height o measured to the longitudinal axis plane 112 which is smaller than the height n. The height o is advantageously approximately 60% to approximately 98% of height n. The height o is advantageously approximately 3 mm to approximately 0.5 mm less than height n.

FIGS. 19 to 21 show a further embodiment of a cutting chain 10 which, like the cutting chain 10 illustrated in FIG. 18, has a projection 69 with a height o on each central connecting link 44, 46. Two connecting links positioned adjacent to one another at right angles to the length 75 (FIG. 5) are designed as locking links 79. The locking links 79 are not connected fast to a cutting segment 43 but have a supporting section 80 with a height p. In this arrangement each locking link 79 has a supporting section 80. The supporting section 80 has a height p measured to the longitudinal axis plane 112 which is smaller than the height o and in particular approximately 0.5 mm to 3 mm smaller than the height o. The height of the supporting section 80 may, however, be as great as the height n of the cutting segments 43. The supporting sections 80 prevent the cutting chain 10 from getting to close to the workpiece, in particular in the area of the nose sprocket 53. This might cause a trailing cutting segment 43 to hit the workpiece, causing vibrations and impacts an a tensioning element of the guide bar 9. This is prevented by the supporting sections 80. FIG. 19 also shows the height a of the drive teeth 45 and the clearly lower height b of the guides 47.

The cutting chain 10 advantageously has only lateral connecting links 42, 79 which have either a cutting segment 43 or a supporting section 80. This prevents the cutting chain 10 from catching on or hitting the workpiece. Each central connecting link 44, 46 advantageously also has a projection 69 which also prevents the cutting chain 10 from catching on the workpiece.

As shown in FIG. 20 in particular, the locking links 79 are constructed separately from one another. In the embodiment the locking links 79 are flat. FIG. 21 shows the detail of the design of the connecting pins 48. The connecting pins 48 are designed as collar studs. This prevents the central connecting links 44, 46 from jamming between lateral connecting links 42, 79. The connecting pins 48 have a central section 81 which is positioned in an opening 93 in the central connecting links 44. The central connecting links 46 have a corresponding opening for the central section 81 of the connecting pins 48. The connecting pins 48 also have lateral sections 82 of lesser diameter on either side of the central section 81. The lateral sections 82 are positioned in openings 92 in the lateral connecting links 42 which have diameters smaller than the central section 81. The connecting pin 48 has a head 83 with a widened diameter on the outside of each the connecting link 42 which secures the connecting pin 48 against the connecting link 42.

Due to the fact that the connecting pins 49 are designed as collar studs with widened central sections 81, it is impossible to push the connecting pin longitudinally through the lateral connecting links 42 for unriveting, i.e. removal of the connecting pin 48, and opening the cutting chain 10. However, in order to open the cutting chain 10 for maintenance and repair and then close it again, at least one point in the cutting chain 10 two adjacent locking links 79 are provided instead of two adjacent connecting links 42 connected by a cutting segment. The locking segments 79 also allow the cutting chain 10 to be produced simply since the cutting chain 10 can be closed once the cutting segments 43 have been attached. Due to the fact that the locking links 79 are not connected by a cutting segment 43 but are constructed separately from one another, once the heads 83 of the corresponding connecting pins 48 have been destroyed the two locking links 79 can be removed laterally outwards from the connecting pins 48. The cutting chain 10 can thus be opened at this point. Using the locking links 79 the cutting chain 10 can also be closed again after repairs, for example after a damaged connecting element 42 has been removed. At least two adjacent locking links 79 are advantageously provided. To produce a cost-effective cutting chain 10 locking links 79 are advantageously provided at several points on the cutting chain 10. At least 80% of all lateral connecting links 42 are advantageously connected fast to cutting segments 43. Fewer than 20% of the lateral connecting links are thus advantageously designed as locking links 79. The locking links 79 shown are advantageous on all cutting chains shown.

Figure 22:
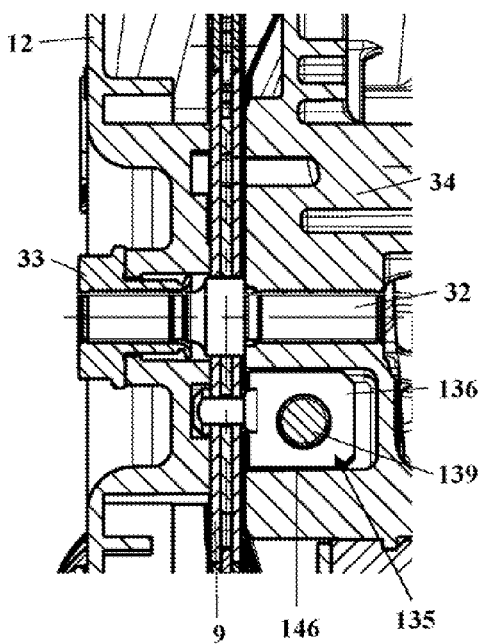
FIG. 22 shows a section through a fixing bolt for the guide bar.

A configuration is possible in which the drive sprocket 24 has only first areas 59 with first recesses 49, and only the nose sprocket 53 is matched to the cutting chain 10 and has at least one second area 71 with a second recess 55. The nose sprocket 53 advantageously has first areas 70 with first recesses 54 and second areas 71 with second recesses 55. To ensure that a guide bar for a saw chain which has only first recesses 49 cannot be fitted on the stone cutter 1, a chain tensioning device 135 for the stone cutter 1 as shown in FIG. 22 can be matched to the guide bar 9 provided for a cutting chain 10. As a result only a guide bar 9 intended for the stone cutter 1 can be fitted on the stone cutter 1 and only a cutting chain 10 intended for the stone cutter 1 can be fitted on the guide bar 9. Thus it is possible to prevent a chain not intended for the stone cutter, a saw chain for sawing wood for example, from being fitted on a stone cutter 1 with a drive sprocket 24 which has only first areas 59.

Figure 24:
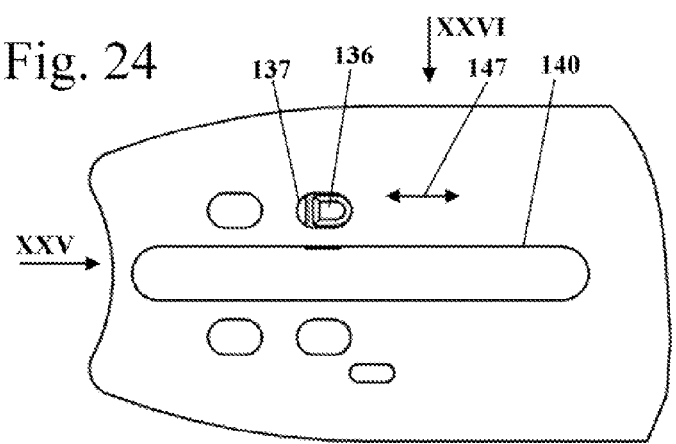
FIG. 24 shows an enlarged view of section XXIV as shown in FIG. 23.

As shown in FIG. 22, the tensioning device 135 has a tensioning element 136 through which runs a tensioning screw 139. The tensioning screw 139 is screwed into a threaded hole 143 in the tensioning element 136 shown in FIG. 27. Turning the tensioning screw 139 moves the tensioning element 136 along the guide bar 9 as illustrated in FIG. 24 by means of arrow 147. On the face projecting towards the outside of the housing the tensioning screw 139 can have an engaging contour for a tool, a slit for a screwdriver for example, for turning the tensioning screw 139. The adjusting element for the tensioning device 135 is advantageously positioned in the area between the fixing nuts 33 (FIG. 2).

Figure 23:
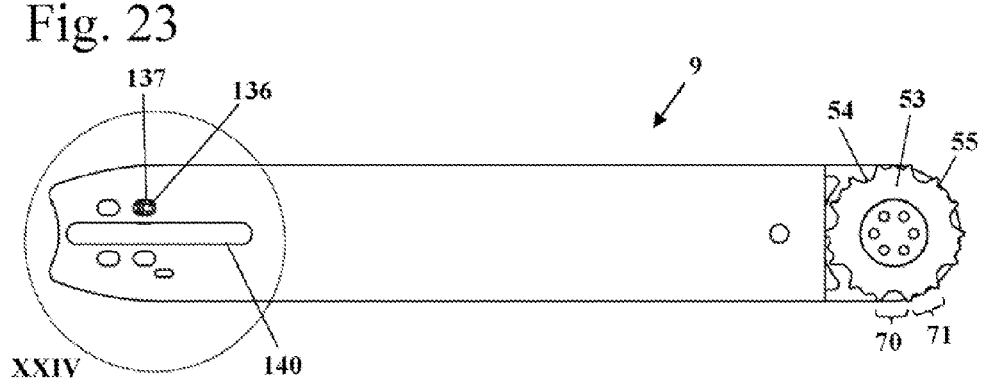
FIG. 23 shows a side view of the guide bar of the stone cutter.

The tensioning element 136 projects through a chain tensioning opening 137 in the guide bar 9 as shown in FIG. 23. The cross-section of the tensioning element 136 is not circular and matches the cross-section of the chain tensioning opening 137 on the guide bar 9. This means that a standard guide bar for a power saw cannot be fitted to the stone cutter 1. The chain tensioning opening 137 is formed as an elongated hole with rounded ends. The guide bar 9 has a total of four openings with contours which match that of the chain tensioning opening 137 and which can be used as chain tensioning openings 137. As also shown in FIG. 23, the nose sprocket 53 has first areas 70 with first recesses 54 and second areas 71 with second recesses 55.

Figure 25:
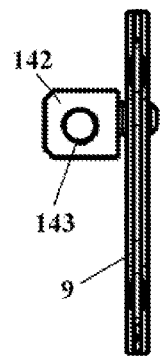
FIG. 25 shows a side view of the guide bar in the direction of arrow XXV as shown in FIG. 24.

FIGS. 24 to 26 show the tensioning element 136 on the guide bar 9 and FIGS. 27 to 31 show the tensioning element 136 in detail. The tensioning element 136 has an area 141 (FIGS. 27 to 31) which has a non-circular cross-section. The area 141 has a rounded rectangular cross-section. The area 141 is so strongly rounded on the side facing the nose sprocket 53 that a semi-circular cross-section is produced. The tensioning element 136 has a guide section 142 (FIGS. 27 to 31) which is approximately cuboid with bevelled edges and through which runs a threaded hole 143. As shown in FIGS. 29 and 30, the area 141 projects beyond the guide section 142 towards the nose sprocket 53 (FIG. 23). As shown in FIG. 22, the guide section 142 is held in a recess 146 in a part 34 of the housing 2. In this arrangement the guide section 142 can be moved longitudinally in relation to the tensioning screw 139 but is fixed in part 34 of the housing 2 such that it is unable to move in the direction of rotation of the tensioning screw 139. When the tensioning screw 139 is turned, the tensioning element 136 turns towards part 34 of the housing 2 in the direction of the arrow 147 and carries the guide bar 9 with it over the area 141. This changes the position of the guide bar 9 relative to the drive sprocket 24 such that the cutting chain 10 can be tightened or loosened depending on the direction in which the tensioning screw 139 is turned.

FIG. 29 shows schematically the cross-section 144 of the chain tensioning opening on a standard guide bar for a saw chain. The cross-section 144 is clearly smaller than the cross-section of area 141. The section of area 141 facing away from the nose sprocket 53 (FIG. 23) projects beyond an opening with a cross-section 144 and forms a blocking contour 145 which prevents a guide bar with a chain tensioning opening which has a cross-section 144 from being fitted.

The specification incorporates by reference the entire disclosure of German priority document 10 2011 115 719.4 having a filing date of Oct. 12, 2011 and German priority document 10 2012 010 962.8 having a filing date of May 31, 2012.

While specific embodiments of the invention have been shown and described in detail to illustrate the inventive principles, it will be understood that the invention may be embodied otherwise without departing from such principles.

What is claimed is:

1. A cutting chain for a hand-operated implement for cutting metal and mineral materials, the cutting chain comprising:
   central connecting links;
   lateral connecting links connecting the central connecting links to each other;
   the central connecting links include first central connecting links configured as drive links each having a first drive tooth, wherein the first drive tooth has a first height measured perpendicular to a direction of length of the cutting chain and relative to an underside of an adjacently positioned one of the lateral connecting links;
   the central connecting links including second central connecting links, wherein the second central connecting links differ from the first central connecting links in that:
      the second central connecting links each have a second drive tooth, wherein the second drive tooth has a second height measured perpendicular to the direction of length of the cutting chain and relative to an underside of an adjacently positioned one of the lateral connecting links, wherein the second height is at most 75% of the first height; or
      the second central connecting links each have a second drive tooth, wherein the first drive tooth is positioned at a first distance to the second drive tooth leading in a direction of travel of the cutting chain and the second drive tooth is positioned at a second distance relative to the first drive tooth leading in a direction of travel of the cutting chain, wherein the first distance is different from the second distance; or
      the second central connecting links have no drive tooth.

2. The cutting chain according to claim 1, wherein only the central connecting links have drive teeth.

3. The cutting chain according to claim 1, wherein the first drive tooth has a first volume and the second drive tooth has a second volume, wherein the second volume is no more than approximately 75% of the first volume.

4. The cutting chain according to claim 1, wherein the first drive tooth has a first surface area and the second drive tooth has a second surface area, wherein the second surface area is no more than approximately 75% of the first surface area.

5. A cutting chain for a hand-operated implement for cutting metal and mineral materials, the cutting chain comprising:
   central connecting links;
   lateral connecting links connecting the central connecting links to each other;
   the central connecting links include first central connecting links configured as drive links each having a first drive tooth;
   the central connecting links including second central connecting links, wherein the second central connecting links differ from the first central connecting links in that:
      the second central connecting links each have a second drive tooth, wherein the second drive tooth is shaped differently than the first drive tooth; or
      the second central connecting links each have a second drive tooth, wherein the first drive tooth is positioned at a first distance to the second drive tooth leading in a direction of travel of the cutting chain and the second drive tooth is positioned at a second distance relative to the first drive tooth leading in a direction of travel of the cutting chain, wherein the first distance is different from the second distance;
   wherein the first drive tooth has a first width and the second drive tooth has a second width, wherein the second width is no more than approximately 75% of the first width.

6. The cutting chain according to claim 1, wherein an outline of the first drive tooth completely covers an outline of the second drive tooth.

7. The cutting chain according to claim 1, comprising cutting segments fixed to the lateral connecting links and adapted to engage a workpiece.

8. A cutting chain for a hand-operated implement for cutting metal and mineral materials, the cutting chain comprising:
- central connecting links;
- lateral connecting links connecting the central connecting links to each other;
- the central connecting links include first central connecting links configured as drive links each having a first drive tooth;
- the central connecting links including second central connecting links, wherein the second central connecting links differ from the first central connecting links in that:
  - the second central connecting links each have a second drive tooth, wherein the second drive tooth is shaped differently than the first drive tooth; or
  - the second central connecting links each have a second drive tooth, wherein the first drive tooth is positioned at a first distance to the second drive tooth leading in a direction of travel of the cutting chain and the second drive tooth is positioned at a second distance relative to the first drive tooth leading in a direction of travel of the cutting chain, wherein the first distance is different from the second distance; or
  - the second central connecting links have no drive tooth;
- cutting segments fixed to the lateral connecting links and adapted to engage a workpiece;
- wherein at least one of the central connecting links has a projection extending into the area positioned along a length of the cutting chain between two of the cutting segments arranged successively.

9. The cutting chain according to claim 7, wherein at least 80% of the lateral connecting links are provided with the cutting segments.

10. A hand-operated implement for cutting metal and mineral materials, the implement comprising:
- a drive motor;
- a drive sprocket connected to the drive motor and driven by the drive motor;
- a guide bar having a nose sprocket mounted on a nose of the guide bar;
- a cutting chain disposed on the guide bar and driven by the drive motor via the drive sprocket around the circumference of the guide bar;
- the cutting chain being guided round a part of the circumference of the nose sprocket;
- the cutting chain having central connecting links and lateral connecting links connecting the central connecting links to each other;
- the central connecting links including first central connecting links configured as drive links each having a drive tooth;
- the first central connecting links being positioned adjacent to a first area of the circumference of the nose sprocket as the first central connecting links run around the nose sprocket;
- the first area having a first recess in which the drive tooth engages as the first central connecting links run round the nose sprocket;
- the central connecting links including second central connecting links positioned adjacent to a second area of the circumference of the nose sprocket as the second central connecting links run around the nose sprocket;
- the second area having a blocking contour which prevents the drive tooth from engaging fully in the second area.

11. The implement according to claim 10, further comprising a chain tensioning device which has a tensioning element engaging in a chain tensioning opening of the guide bar, the tensioning element having an area of non-circular cross-section and the area of non-circular cross-section engages in the chain tensioning opening.

12. The implement according to claim 10, wherein the first area and the second area extend over an approximately identical angle at the circumference of the nose sprocket.

13. The implement according to claim 10, wherein the nose sprocket has at least two of said second area.

14. The implement according to claim 10, wherein the first central connecting links and the second central connecting links are arranged alternatingly along the length of the cutting chain.

15. The implement according to claim 10, wherein the second central connecting links each have a guide engaging in the guide bar, wherein the guide has a height measured perpendicular to the length of the cutting chain, wherein the height is smaller than a height of the drive tooth measured perpendicular to the length of the cutting chain.

16. The implement according to claim 15, wherein the shape of the guide is the same as the shape of a section of the drive tooth.

17. The implement according to claim 10, wherein the blocking contour is formed on a second recess positioned in the second area, the shape of the second recess being matched to the shape of the second central connecting links.

18. The implement according to claim 10, wherein the blocking contour is formed on a second recess positioned in the second area, the position of the second recess being matched to the position of the second central connecting links.

19. The implement according to claim 10, wherein the second central connecting links have no section which engages in the nose sprocket and the nose sprocket has no recess in the second area.

20. The implement according to claim 10, wherein the cutting chain is guided round a part of the circumference of the drive sprocket, the drive sprocket having at least one first area positioned adjacent to one of the first central connecting links as the cutting chain runs around the drive sprocket and at least one second area positioned adjacent to one of the second central connecting links as the cutting chain runs around the drive sprocket, the first area of the drive sprocket having a first recess in which the drive tooth engages and the second area of the drive sprocket having a blocking contour which prevents the drive tooth from engaging fully in the second area of the drive sprocket.

21. The implement according to claim 10, wherein at least some of the lateral connecting links have cutting elements.

22. A hand-operated implement for cutting metal and mineral materials, the implement comprising:
- a drive motor;
- a drive sprocket connected to the drive motor and driven by the drive motor;
- a guide bar;
- a cutting chain disposed on the guide bar and driven by the drive motor via the drive sprocket around the circumference of the guide bar;
- the cutting chain being guided round a part of the circumference of the drive sprocket;
- the cutting chain comprising central connecting links and lateral connecting links that connect the central connecting links to one another;

the central connecting links including first central connecting links configured as drive links each having a drive tooth;

the first central connecting links each positioned adjacent to a first area of the circumference of the drive sprocket as the first connecting links run around the drive sprocket;

the first area having a first recess in which the drive tooth engages as the first central connecting links run round the drive sprocket;

the central connecting links including second central connecting links positioned adjacent to a second area of the circumference of the drive sprocket as the second central connecting links run around the drive sprocket;

the second area having a blocking contour preventing the drive tooth from engaging fully in the second area.

\* \* \* \* \*